United States Patent
Katz

(10) Patent No.: US 6,894,639 B1
(45) Date of Patent: May 17, 2005

(54) GENERALIZED HEBBIAN LEARNING FOR PRINCIPAL COMPONENT ANALYSIS AND AUTOMATIC TARGET RECOGNITION, SYSTEMS AND METHOD

(75) Inventor: Alan Jerry Katz, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 07/810,005

(22) Filed: Dec. 18, 1991

(51) Int. Cl.⁷ ............................................. G01S 13/00
(52) U.S. Cl. ............................ 342/90; 342/27; 342/89; 342/159; 342/175; 342/195; 706/15
(58) Field of Search .............................. 342/27, 28, 61, 342/62–81, 89–103, 159–164, 175, 192, 193–197, 22; 367/87, 93–98, 135, 136; 704/200, 231, 232–257; 706/15–44; 382/103

(56) References Cited

U.S. PATENT DOCUMENTS

| | | | | |
|---|---|---|---|---|
| 3,913,099 A | * | 10/1975 | Wehner et al. | 342/192 |
| 3,967,282 A | * | 6/1976 | Young et al. | 342/22 |
| 3,992,710 A | * | 11/1976 | Gabriele et al. | 342/90 |
| 4,001,820 A | * | 1/1977 | Rosenbaum et al. | 342/192 |
| 4,389,647 A | * | 6/1983 | Fanuele et al. | 342/192 |
| 4,484,193 A | * | 11/1984 | Bellew | 342/98 |
| 4,490,718 A | * | 12/1984 | Opitz et al. | 342/192 |
| 4,641,138 A | * | 2/1987 | Opitz | 342/192 |
| 4,829,306 A | * | 5/1989 | Gjessing et al. | 342/159 |
| 4,847,817 A | * | 7/1989 | Au et al. | 367/135 |
| 4,897,660 A | * | 1/1990 | Gold et al. | 342/192 |
| 4,907,001 A | * | 3/1990 | Harmuth | 342/159 |
| 4,995,088 A | * | 2/1991 | Farhat | 706/40 |
| 5,040,214 A | * | 8/1991 | Grossberg et al. | 704/240 |
| 5,078,952 A | * | 1/1992 | Gozani et al. | 706/20 |
| 5,376,940 A | * | 12/1994 | Abatzoglou | 342/192 |
| 5,943,661 A | * | 8/1999 | Katz | 706/16 |

FOREIGN PATENT DOCUMENTS

| | | | | |
|---|---|---|---|---|
| WO | WO91/02323 | * | 2/1991 | G06F/15/80 |

* cited by examiner

Primary Examiner—Bernarr E. Gregory
(74) Attorney, Agent, or Firm—Baker Botts L.L.P.

(57) ABSTRACT

This application discloses a method for distinguishing targets from clutter, comprising the steps inputting data, calculating data statistics from said data and using said data statistics to select target specific feature information to distinguish specific targets from background clutter, generating said target specific feature information from said data statistics, extracting said target specific feature information from said data, using said target specific feature information to distinguish specific targets from background clutter, and outputting target and background clutter information. Classification systems, including hardware and software embodiments, are also disclosed.

20 Claims, 7 Drawing Sheets

GENERALIZED HEBBIAN LEARNING FOR PRINCIPAL COMPONENT ANALYSIS AND AUTOMATIC TARGET RECOGNITION, SYSTEMS AND METHOD (C) Copyright, Texas Instruments Incorporated 1991. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to products and methods pertaining to pattern recognition and classification procedures, parallel computer architectures, learning techniques, and neural networks.

BACKGROUND OF THE INVENTION

Target recognition and pattern classification involves the evaluation of new observations on the basis of past observations to distinguish targets or desired patterns from background clutter. This task is complicated by the complex nature of real world environments. Moreover, the computational overhead of many practical classification problems strain serial computer resources.

With respect to the complexity of pattern recognition and pattern classification techniques, many of these techniques rely on feature information to differentiate preferred targets from background clutter. Coordination and selection of this feature information is an ongoing problem, as the desired feature information itself (e.g., contrast-based and texture-based) often varies from target to target (e.g., size, stationary, make-up, composition, orientation), target to background (e.g. location of target), data set to data set (e.g., lighting, time-of-day, ambient temperature, and context of scene, sensor characteristics), and data source to data source (e.g., one-dimensional or multi-dimensional data, such as digitized infrared imagery, digitized TV imagery, digitized Infra-red imagery, speech samples, or radar samples).

Recently, researchers have focused on the perception of features in the visual field by biological visual systems and the organization of these biological visual systems. In short, this research has focused on what features are perceived and how are the receptive fields (e.g. neurons sensitive to particular features) organized. This work contributes to the understanding of biological vision systems and lays the groundwork for artificial vision systems in such areas as robotics and automatic target recognition.

In particular, D. J. Hubel and T. N. Wiesel in their article Hubel, D. J. and Wiesel, T. N, "Receptive Fields, Binocular Interaction, and Functional Architecture in The Cat's Visual Cortex." *Journal of Physiology.* vol. 160, pp. 106–154 (1962) and D. Marr in his book Marr, D. *Vision* W. H. Freeman and co. San Francisco 1982 are credited with initiating research in this field. Recent work, however, in artificial neural networks suggests mechanisms and optimization strategies that explain the formation of receptive fields and their organization in mammalian vision systems. This work includes Miller, K. d., Keller, J. B. and Stryker, M. P. "Ocular Dominance Column Development: Analysis and Simulation." *Science*, vol. 245, pp. 605–615 (1989), Durbin, R. and Michison, G. "A Dimension Reduction Framework For Understanding Cortical Maps." *Nature*, vol. 343, pp. 644–647 (1990), Linsker, R. "Self Self-organization In a Perceptual Network." Computer vol. 21, pp. 105–117 (1988), and Kammen, D. M. and Yuille, A. L. "Spontaneous Symmetry-breaking Energy Function." *Biological Cybernetics*, vol. 59, pp. 23–31 (1988). Linsker demonstrated how Hebbian learning algorithms, which change synaptic connections according to the degree of correlation between neuronal inputs and outputs, give rise to layers of center-surround and orientation-selective cell, even if the input to the initial layer is random white Gaussian noise. Kammen and Yuille show that orientation-selective receptive fields can also develop from a symmetry-breaking mechanism. Under certain conditions, the receptive fields perform a principal component analysis of the input data, as was shown in Oja, E. J. "A Simplified Neuron Model As A Principal Component Analyzer." *Mathematics and Biology*, vol. 15, pp. 267–273 (1982). Similarly, the article by Brown, T. H., Kairiss, E. W., and Keenan, C. L., "Hebbian synapses: Biophysical mechanisms and algorithms," Annual Review of Neuroscience, vol. 13, pp. 475–511 (1990) suggested Hebbian learning occurs in nature.

With respect to the computational requirements, neural networks provide parallel computational implementations. These networks embody an approach to pattern recognition and classification based on learning. Example patterns are used to train these networks to isolate distinctions between the particular patterns and background clutter for proper classification.

With respect to neural networks, the architecture of a neural network can be simply represented by a data-dependency graph, such as that shown in FIG. 1. As shown, this data-dependency graph includes a set of active nodes 4 and a set of passive communicative links 6. The graph nodes 4 represent artificial neurons and the passive communication links 6 define unidirectional communication paths between the artificial neurons 4 (graph nodes 4). Additional links 2 are used as network inputs, which indicate which neurons will receive input signals from outside the network. Similarly, additional links 8 are used as network outputs, which indicate which neurons will transmit output signals to outside the network. A communication link 6 effectively makes the output state of one neuron at the tail of the link available to the neuron at the head of the link. For example, if the neuron states were made available as electrical voltages or currents, the communication links could be provided as simple conductive wires.

Referring to FIG. 2, some architectures are feed-forward, wherein signals are inputed through communication links 2 which direct the input signals, flow through the communication links 6 to the neurons 4 in the neural network in a layer-by-layer fashion, and outputted through the communications links 8 which direct the output signals. No circular path of feedback exists within this type of network. Other networks are fully interconnected, wherein all neurons are connected to all other neurons. FIG. 3 shows an example of this type of network, wherein all neurons 4 are connected to all other neurons 4 through corresponding communication links 6 with input and output communication links as shown. In general, each neuron in a neural network architecture has a high fan-in and a high fan-out.

With respect to the neuron function itself, neuron states are generally defined by non-linear local functions. The output value of a neuron is defined by a transfer function, which depends only upon the neurons' current internal state, a set of local parameters called synapses, and the value of signals received from other neurons. FIG. 4 shows a simplified schematic of a neuron, along with its network links 12, synaptic parameters 14, and typical input-output transfer function 16. Input voltages $V_1, V_2, V_3, \ldots V_N$ are received from other neurons and output voltage $V_i$ is outputted to other neurons. The neuron transfer function 16 is usually described as a non-linear function of the sum-of-products of the synapse parameters 14 with their associated input signal values. FIG. 5 shows a typical non-linear function that must be provided by each neuron that operates according to equation 1, which is defined as follows $$V_i = F\left(\sum_{j=1}^{N} \sigma_{ij} V_i\right)$$

In defining the transfer function described by equation 1, $V_i$ is the output value (or state) of neuron i, $$\sum ij$$

is the value of the synapse parameter that modifies the effect of the output of neuron j on the state of neuron i, and F is a function of the sum-of-products of the synapses with neuron states. With respect to FIG. 5, F is a linear function of the sum-of-products input near the zero sum region, while saturating to positive and negative values when the sum exceeds a preset positive or negative value.

With respect to training and using the neural network, the synapses affect the transfer function by modulating the strength of signals received from other neurons in the network. In virtually all models, the behavior of the network as a whole is changed by altering the values of the synaptic parameters. Once the parameters are altered, inputs can be applied to the network, and the processed output taken from the designated set of neurons. The time during which the synapse parameter values are altered is generally called the Training Phase. The time during which input signals flow through the network while the synapse parameters remain fixed is called the Recall or Relaxation Phase.

With respect to neuron circuit embodiments, FIG. 6 shows the schematic diagram of an artificial neuron implemented using resistors and an operational transconductance amplifier. The resistors $R_{ij}$ are associated primarily with the synapses in equation 1, while the operational transconductance amplifier (OTA) and its feedback component $R_6$ is used to provide the desired transfer function $F_i$.

With respect to the operation of an OTA, as shown in FIG. 6, an ideal OTA generates an output voltage proportional to the difference of the currents entering its inputs, multiplied by a very large gain factor. FIG. 7 shows an ideal OTA. The defining equation 7 for this circuit may be derived by the analysis, as follows $$V_{OUT} = A(i_2 - i_1) \quad A \ggg 1$$

$$i_1 = i^- + i_0$$

$$V_{out} = A(i^+ - i^- - i_0)$$

$$i_o = \frac{V_{out}}{Z_F}$$

Thus, $$V_{out} = \frac{Z_F A}{A + Z_F}(i^+ - i^-)$$

If $A \gg Z_F$, $$V_{out} = Z_F(i^+ - i^-)$$

The gain factor A is infinite in the idea case, and very large values of A (Over 1 million) can be obtained in practice using off-the-shelf OTA components. An ideal OTA will have a zero input resistance at its inputs, so that the operation of the circuit may be understood by assuming equation 7, and by assuming that the voltage at either input referenced to ground is always zero. Electrical components placed between the output of an OTA and its negative input induce negative current feedback in the circuit while components placed between the OTA output and its positive input induce positive current feedback. Simple resistive feedback causes the OTA to generate an output voltage proportional to the net current difference at its' positive and negative input terminals, as shown in FIG. 8 and the corresponding equations 8, 9 and 10, which are as follows $$V_i = R_{FI}\frac{V_2}{R_2} - \frac{V_1}{R_1} \quad V_1 = \sum_{j=1}^{2} \sigma_{ij} V_j \quad \sigma_{ij} = \frac{R_{FI}}{R_j}$$

Using these assumptions, the operation of the neuron circuit can be explained. The resistors attached to the input of the amplifier shown in FIG. 6 serve to produce input currents proportional to the product of the input voltages $V_j$ and the conductances of the resistors $R_{ij}$. The input resistors thus act as the synaptic parameters in FIG. 4, while the neuron state values are represented as the output voltages of the OTAs that implement each neuron function. In general, synapse parameters can be bipolar. That is, these parameters can take on positive and negative values. However, it is not simple in general to implement negative conductances that physically represent mathematically negative synaptic parameters. Fortunately, the differencing nature of the OTA can be used to provide the effect of negative conductances using positive conductance elements. This is accomplished by attaching resistors that provide the absolute (positive) value of the desired conductance to the negative input of the OTA. Since the subtraction of a positive current in the OTA is equivalent to the addition of a negative current, negative synapse parameters can be equally well implemented using standard resistive elements. The feedback resistor $R_6$ defines the slope of the OTA transfer function in the linear region, while the power supply voltages determine the limiting values of the transfer function in regions of strong negative and positive bias. The circuit shown in FIG. 6 provides the basic functional requirements for a typical neural network neuron. Using a more complex feedback impedance in place of $R_6$ can provide more complex transfer functions when necessary.

FIG. 9 shows a schematic of a general neural network based on the use of resistor elements for the synapse parameters and OTAs for the neurons. A non-intersecting grid of wires is used to allow synapse resistors to be connected from OTA outputs to OTA inputs. Pairs of grid lines are used to allow each synapse resistor to be connected from an OTA output to either a positive or negative OTA input terminal. This functionality may be implemented in a software domain as well. For instance, the software algorithm shown in Table 1 produces a dynamic change in neuron state similar to the dynamic changes expected from the OTA array shown in FIG. 9. The synaptic parameters (Resistor values) are assumed to be fixed and pre-stored in a two dimensional matrix R. The OTA feedback resistors are assumed to be the same for all neurons. The neuron states are assumed to be initially preset to certain values and are initially defined by a one dimensional matrix V. All parameters are assumed to be double precision floating point. While only the relaxation model is shown, other models exist and are well known in the art. The training algorithm varies according to the specific neural network type.

SUMMARY OF THE INVENTION

This application discloses a method for distinguishing targets from background clutter, comprising the steps of inputting data (e.g., one-dimensional or multidimensional data, such as digitized infrared imagery, digitized TV imagery, speech samples, or radar samples), calculating data statistics from the data and using said data statistics to select target specific feature information (e.g., contrast-based and texture-based) to distinguish specific targets from background clutter, generating the target specific feature information from the data statistics, extracting the target specific feature information from the data, using the target specific feature information to distinguish specific targets from background clutter (e.g., parametric and non-parametric techniques and one-class, two-class, or multi-class classification procedures), and outputting target and background clutter information. In particular, this method uses the Hebbian Learning to distinguish and take advantage of second order correlation information.

The invention may also be incorporated into a classification system, comprising a data input (e.g., one-dimensional or multi-dimensional data, such as digitized infrared imagery, digitized TV imagery, speech samples, or radar samples), a calculator to calculate data statistics from the data input, a selector to use the data statistics to select target specific feature information (e.g., contrast-based and texture-based) to distinguish specific targets from background clutter, a generator to generate the target specific feature information from the data statistics, a feature extractor to extract target specific feature information from the data input, and a classifier to use the target specific feature information to distinguish targets from background clutter and output target and background clutter data (e.g., parametric and non-parametric techniques and one-class, two-class, or multi-class classification procedures).

The advantages of this method and system and the corresponding hardware and software embodiments are that they generate and select the target specific feature information for the classification of preferred targets in the context of particular backgrounds, and thereby increases the robustness of the overall classification process. In particular, this method and system uses a variation of the Hebbian learning algorithm and recently discovered relationships between neural network Hebbian learning algorithms and statistically-based principal component analysis to generate a set of distinguishing target characteristics pertinent to the classification and separation of targets from background clutter in automatic target recognition applications.

In addition, advantages also include the tailoring the features (in the form of principal component filters) to reflect the characteristics of a specific target or target class which leads to separability of the targets based on a relatively small number of features, which reduces the size of the feature space and the corresponding size of the training set required for adequate generalization. Similarly, using only target training examples for feature generation removes biases that arise from nonrepresentative clutter training sets and signal-to-noise ratios aid in identifying features that are more robust over the training data. Likewise, hierarchies of feature filters covering relevant length scales in the image set provide further discrimination of the object classes and indicate any scale invariant properties of the objects. Finally, carrying out filter convolutions is a local operation and can be parallel over the image to yield fast implementation times.

Although our focus is on automatic target recognition, the described learning and classification methods extend to a variety of pattern recognition domains. The invention may be implemented in software and hardware configurations as well. Parallel computer archetectures, such as neural networks, are used extensively.

BRIEF DESCRIPTION OF THE DRAWINGS

Further features and advantages will become apparent from the following and more particular description of the various embodiments of the invention, as illustrated in the accompanying drawing, wherein:

FIG. 12b is a graph showing the separability of target and clutter objects based on variance values derived from the third filter in FIG. 12a.

Figure 1:
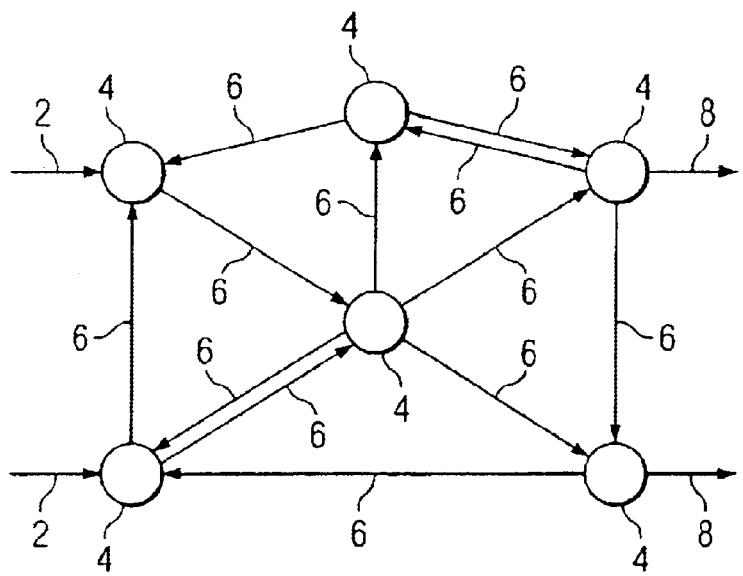
FIG. 1 shows a data-dependency graph of a typical neural neural network.
Figure 2:
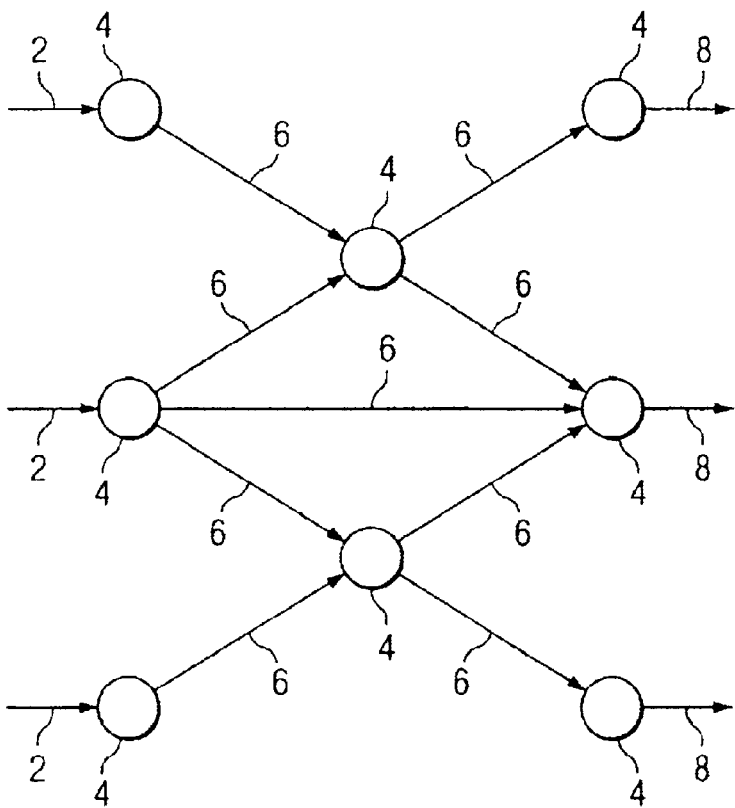
FIG. 2 shows an example of a feed-forward neural network.
Figure 3:
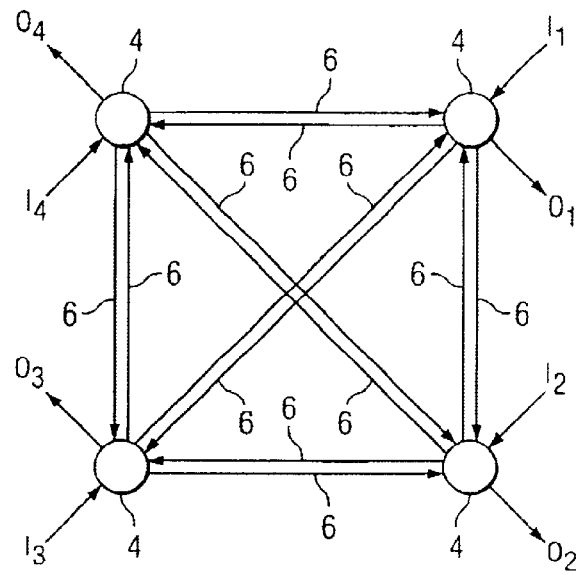
FIG. 3 shows an example of a fully connected neural network.
Figure 4:
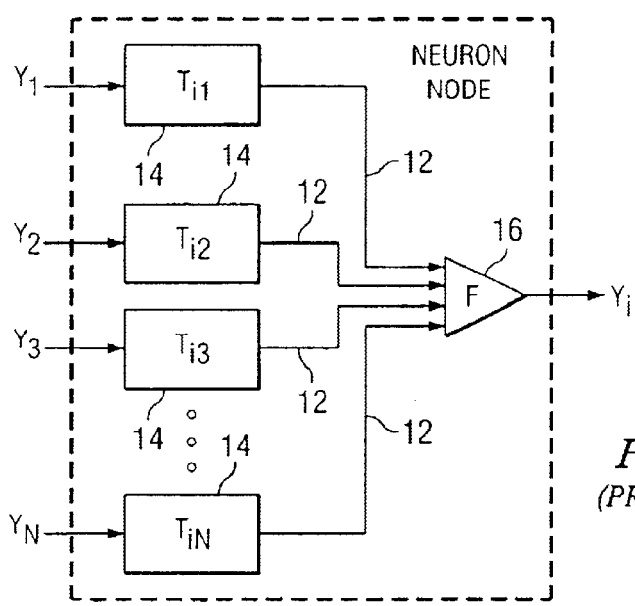
FIG. 4 shows a simplified schematic of a neuron, along with its network links, synaptic parameters, and typical input-output transfer function.
Figure 5:
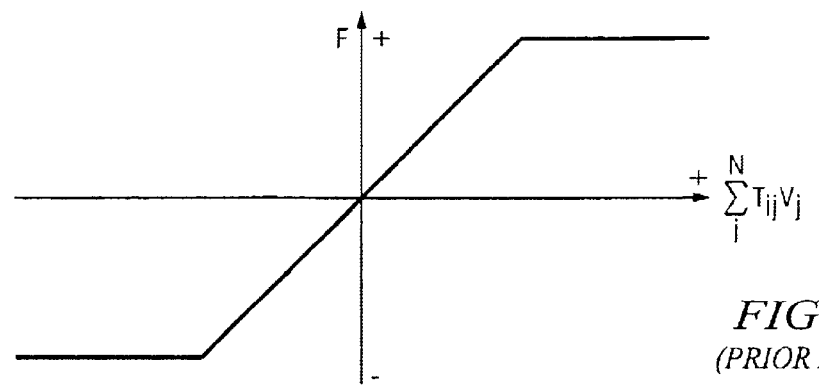
FIG. 5 shows a typical non-linear function provided by each neuron operating according to defining equations.
Figure 6:
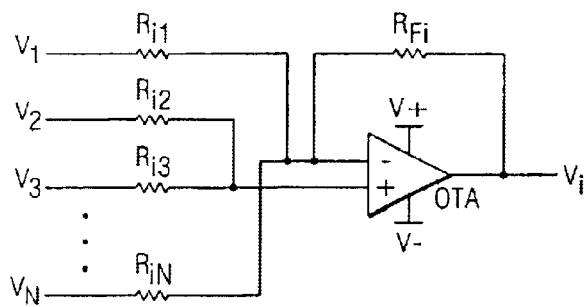
FIG. 6 shows the schematic diagram of an artificial neuron implemented using resistors and an operational transconductance amplifier.
Figure 7:
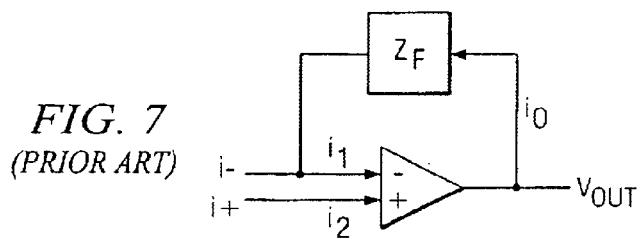
FIG. 7 shows an ideal operational transconductance amplifier.
Figure 8:
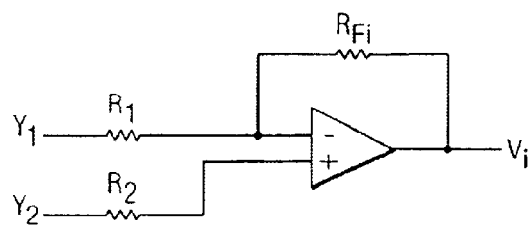
FIG. 8 is a 2-input operational transconductance amplifier, which shows how equation 1 is provided.
Figure 9:
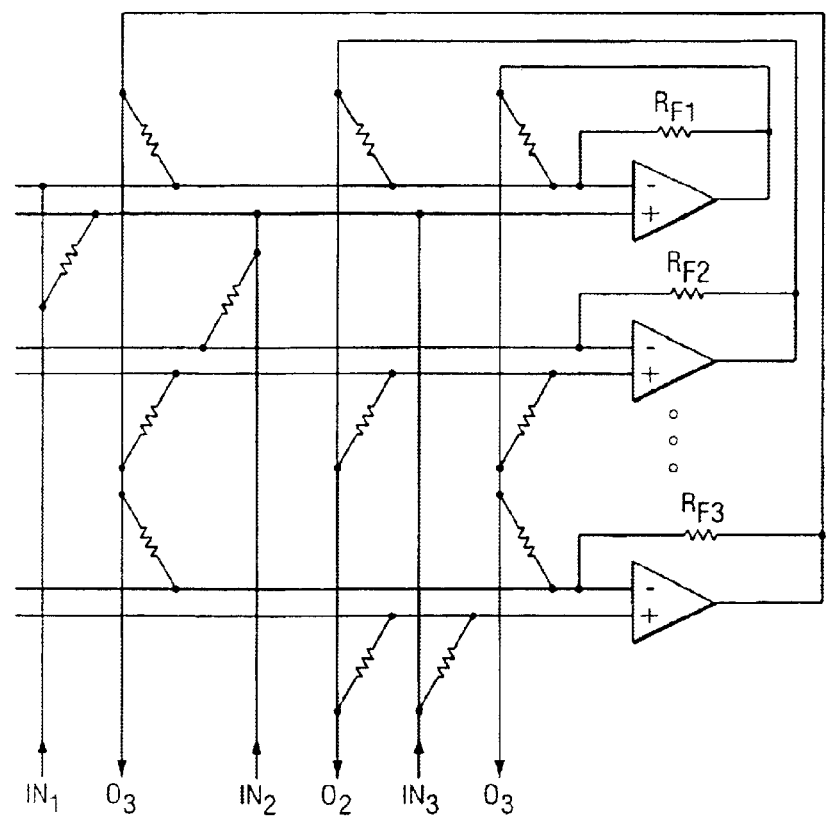
FIG. 9 shows a schematic of a general neural network based on the use of resistor elements for the synapse parameters and OTAs for the neurons.

Table 1 shows a software algorithm that produces a dynamic change in neuron state similar to the dynamic changes expected from the OTA array shown in FIG. 9.

Table 2 is a description of the two data sets discussed in text.

DETAILED DESCRIPTION OF THE PREFERRED EMBODIMENTS

Figure 10:
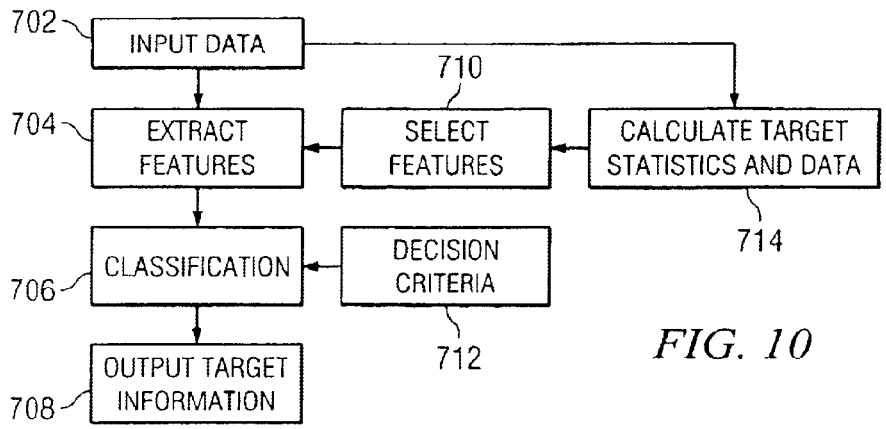
FIG. 10 shows a preferred system configuration.

FIG. 10 shows a preferred classification system configuration. As shown in FIG. 10, the classification system inputs the data in module 2, extracts feature information from the inputted data in module 4 and inputs the feature information into the classification module 6 which uses decision criteria 12 to classify the target from background clutter and outputs this information in module 8. The feature selection module 10 uses target statistics and data which are extracted from the input data in module 14 to select and generate features specific to a given target class and inputs this information into module 4 that extracts features. These distinguishing target characteristics help the classifier separate targets from background clutter, which makes the classification system more robust.

In particular, the preferred system shown in FIG. 10 accepts primarily long-wavelength infrared (IR) and television (TV) imagery to be analyzed. As discussed, infra, the data inputs are primarily derived from two data sets that characterize two target scenarios: targets that are partially occluded (e.g., targets along tree lines) and targets that resemble background clutter. Various procedures are used to extract feature information, which will be discussed infra in conjunction with the feature selection process. The preferred system shown in FIG. 10 uses binary tree structure to classify inputted feature information, wherein the parameters defined by the eigenvalues associated with the principal components, discussed infra in conjunction with the feature selection process, constitute the decision criteria.

With respect to the feature selection process, the preferred embodiment uses target statistics and a neural network that implements a generalized Hebbian learning algorithm to select and generate features specific to a given target class. The generalized Hebbian learning algorithm employed, which was discussed in the Sanger, T. D. "Optimal Unsupervised Learning." *Neural Networks* vol. 2, pp. 459–473 (1989), selects features for automatic target recognition from the inputted imagery. The generalized Hebbian Learning algorithm generates principal components or receptive features that resemble those found in Linsker's work, discussed supra. Inter alia, Sanger shows that the GHA determines the principal components of the data set in order of decreasing eigenvalue, which is important because the higher eigenvalue components are generally the most important or prominent features.

The generalized Hebbian learning algorithm trains a one-layer neural network, where the input nodes define arrays of pixel intensity values from image data and the output nodes index the principal components. Sanger describes the procedure with the following equation:

$$c_{ij}(T+1) = c_{ij}(T) + \gamma(T)\left[Y_i(T)x_j(T) - Y_i(T)\sum_{k \le i} c_{kj}(T)y_k(T)\right]$$

where $c_{ij}$ is the weight or connection strength between the $j^{th}$ input neuron and the $i^{th}$ output neuron, $x_j$ is the $j^{th}$ component of the input vector, $y_i$ is the $i^{th}$ component of the output vector, and $Y(T)$ is a learning parameter that decreases with time such that $$\lim_{T \to \infty} \gamma(T) = 0 \text{ and } \sum_{T=0}^{T=\infty} \gamma(T) = \infty$$

The second term on the rhs of equation 1 is the Hebbian term and the third term ensures that the algorithm learns successive eigenvectors (which are the principal components) of the co-variance matrix of the input vectors ordered by decreasing eigenvalue. This decomposition of the co-variance matrix in terms of eigenvectors is the well-known Karhunen-Loeve transform. Local operations affect equation 1, which distinguishes the relationship described in equation 1 from other relationships characterized by the Karhunen-Loeve transform and underscores the importance of equation 1 for training neural networks. Whereas Sanger applies equation 1 to image coding, texture segmentation, and the generation of receptive fields, principal components have been used to characterize image texture, as discussed in Ade, F. "Characterization Of Textures By Eigenfilters." *Signal Processing*, vol. 5, pp. 451–457 (1983) and are used in the preferred embodiment.

The preferred embodiment uses equation 1 to develop receptive fields for identifying a specific target object. The extracted characteristics of the target object are embedded in the second-order image statistics. Inputs to the network are r×s arrays of pixel values, which are rastered into r×s component vectors, from image subregions that contain the target of interest. The resulting principal components are directions in the r×s dimensional input space with maximum variance. Projections of input vectors along the principal component directions are maximally distinguishable. Eigenvalues corresponding to the principal components determined from equation 1 provide a measure of the variance in the principal component directions. Since vectors in the input space are made up of pixel intensities, the principal components generally correspond to prominent intensity patterns or features in the object of interest. The preferred embodiment trains on several examples of the target object to smooth out noise present in individual examples and to generate principal components that signify features common to different occurrences of the object.

The generated principal components are arrayed in r×s matrices to produce receptive fields or filters that are convolved with the original image data during classification. The preferred embodiment convolves these filters such that the spatial sampling of pixel intensities used to construct the input vectors is preserved. Next, every r×s array of pixels contained in the image subregion of interest is multiplied by the generated filters and then compute the variances of the resulting convolutions. Variances (these are related to the eigenvalues of the principal components) or ratios of the variances (these provide a measure of the relative content of two patterns) compose the parameter sets used for classification. The preferred embodiment uses range information, if available, to scan the image to properly adjust the size of the box or window circumscribing the subregion of interest to reflect the target size.

The spatial sampling density entering into the construction of the input vectors is an important parameter in the generation of the receptive fields. This parameter corresponds to the synaptic connection density in Linsker's Hebbian algorithm, discussed supra, which only yields principal components if the connection density is held fixed. The preferred embodiment uses the spatial sampling density to determine the scale of the feature. Please note that the spatial sampling density must be appropriately scaled to ensure that the same feature scale is measured in all cases, if the target object occurs at different ranges in the image data, as in the inputted data reviewed in the preferred embodiment. As the spatial sampling density for targets at nearer ranges are reduced, the preferred embodiment averages over the shorter length scales to avoid aliasing effects. Thus, the preferred embodiment assumes that the target at the longest range fits into a u×v pixel box. Input vectors for this case are formed from intensity values of r×s blocks of pixels (where these blocks are smaller than the box size) extracted from the box circumscribing the target object. The preferred embodiment composes input vectors from 2r×2 s blocks of pixels for targets at half the initial range and extracts the intensity value from every second pixel. The preferred embodiment continues in this fashion in closer ranges.

The preferred embodiment also scales the spatial sampling density for a given target sample to generate a hierarchy of receptive fields at different scales. The relevant scales are set by the smallest scale detectable (effectively the resolution) for the target seen at longest range and the size of the target object. This hierarchy characterizes the target object in terms of what features become relevant at different length scales. For example, self-similar objects, which are objects that look the same at any scale, are expected to have an invariant feature set as a function of scale. Scaling of the spatial sampling density resembles renormalization group analysis that assumes system behavior is governed by how the physical operators scale, discussed in Wilson, K. G. "The Renormalization Group: Critical Phenomena And The Kondo Problem." *Review of Modern Physics* vol. 47, PP. 773–840 (1975).

The inventor used test data sets with military targets to evaluate the effectiveness of the preferred system implementation, described supra. Table 2 shows a description of the two data sets used. Images in data set I were TV whereas those in data set II were long-wavelength IR. Target objects for both data sets were of several different types, so the preferred embodiment needed to find receptive fields common to all types. Different orientations of the target objects in these data sets did not appear to generate problems. Apparently, targets from data set I were positioned in the field-of-view at long enough range that there was little sensitivity to orientation, and targets from data set II were sufficiently spherically symmetric to neutralize orientation effects. Preprocessing procedures were used to normalize linearly the pixel intensities so they fell in the range from 0 to 255.

The inventor defined clutter objects for both data sets as any region in the image passed by the screener and not a target fell into the clutter class, which is consistent with conventional screeners. The inventor then used this definition to measure the capability of the principal component features to distinguish targets from objects similar in appearance.

Figure 11:
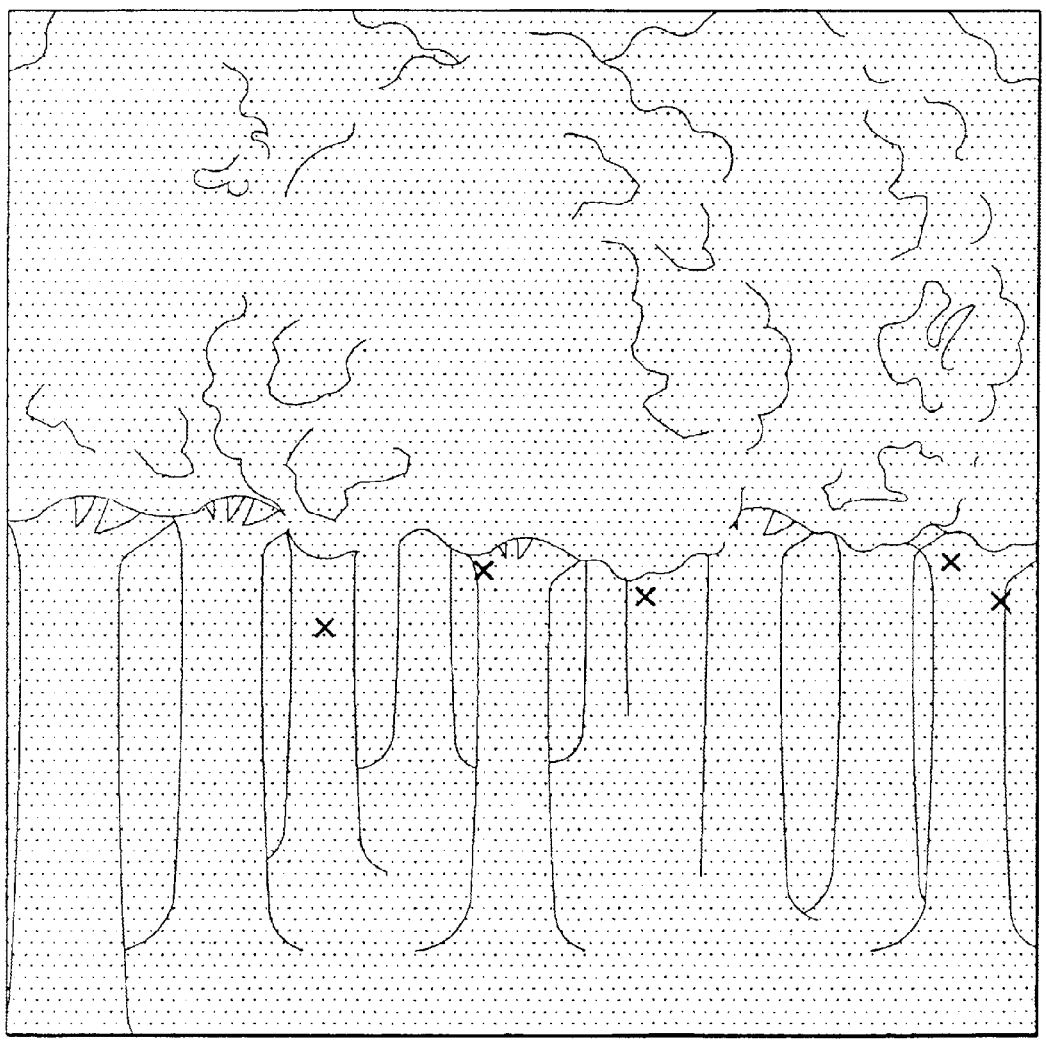
FIG. 11 is a TV image from data set I, which contains the five targets (marked with an "x"). that were used for training.

FIG. 11 is a TV image from data set I, which contains the five targets (marked with an "x") that were used for training. For data set I, the experiments used 3×3 pixel filters using five targets contained in a single image and tested filter performance on 9 additional images. Targets in the training image represented different types of the target class. Target heights in data set I ranged from 4 pixels to 32 pixels.

Figure 12A:
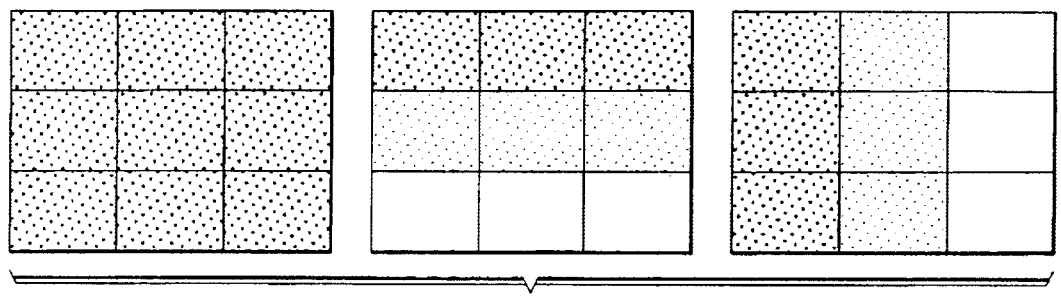
FIG. 12a shows 3×3 pixel filters determined by learning with the generalized Hebbian algorithm, which are the first three principal components for the training target regions from data set I.

FIG. 12a displays the 3×3 pixel filters determined by learning with the generalized Hebbian algorithm, which are the first three principal components for the training target regions from data set I. The first filter emphasizes regions that have strong grayshade contrast with the background environment; most of the targets show strong contrast with background. The second and third features highlight regions with strong horizontal and vertical grayshade gradients, respectively; target regions all have sharp transitions in grayshade, from pixels within the targets to pixels outside the targets.

Figure 12B:
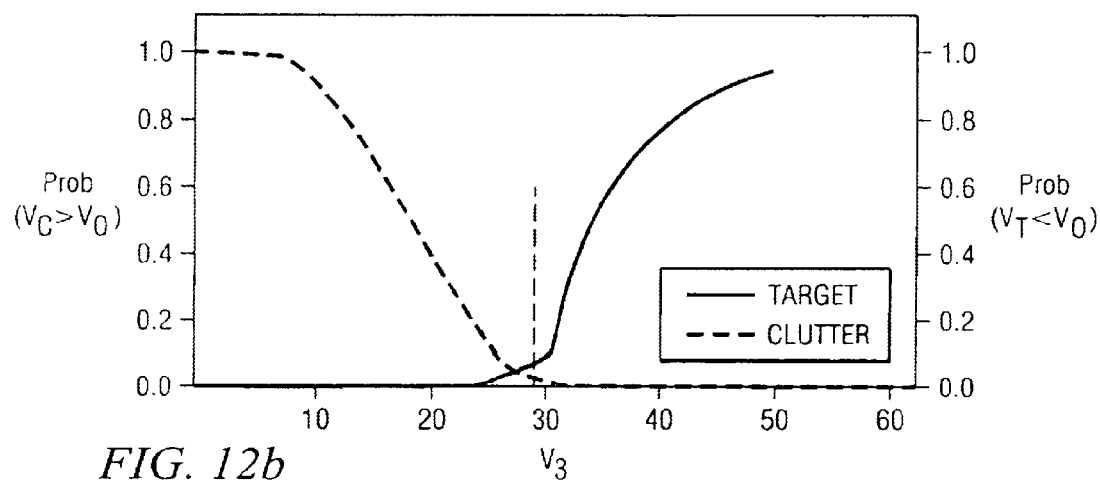

FIG. 12b shows the separability of target and clutter objects based on variance values derived from the third filter in FIG. 12a. Abscissa values $V_3$ are the variances derived from Filter 3 in FIG. 12a. The left-hand curve is the probability for a clutter region to have a variance $V_c$ larger than variance $V_o$; the right-hand curve is the probability for a target region to have a variance $V_t$ smaller than variance $V_o$. The dotted line indicates the lower-bound on $V_t$ determined from the training data. Please note the dotted line lies close to the point where the two probability curves cross, which marks the demarcation point in a Bayes classification approach. In particular, FIG. 12b indicates that most of the background clutter has a much smaller vertical gradient content than the targets; tree lines and roads and horizons in the image set extend mostly parallel to the horizontal edges of the image and provide little vertical gradient content. The inventor also examined the same images with a feature set based on contrast and edge measures and found that between 8 and 16 of these features were required to achieve the same level of separability found in FIG. 12b and that the discriminant surface, which divided targets and clutter, was highly nonlinear.

The experiments generated eight 5×5 pixel filters, which are shown in FIGS. 13a, 13b, 13c, 13d, 13e, 13f, 13g, and 13h for target set II from four examples in a single image and tested filter performance on 23 images. The 5×5 pixel filters were derived from training data for data set II. The filters shown represent the top eight principal components and are ordered by decreasing eigenvalue. Only filters 4 and 5 were used for classification. SIN denotes the signal to noise ratio defined infra. In addition, the 5×5 pixel filters shown in FIGS. 13a, 13b, 13c, 13d, 13e, 13f, 13g, and 13h represent top eight principal components ordered by decreasing eigenvalue. Target heights ranged from 15 pixels in the far range to 175 pixels in the near range. Data set II was in several ways more challenging than the first data set because the noise level was higher and the target texture was very similar to the texture of the clutter. The filters were ranked by a signal-to-noise ratio (SIN), as shown in FIGS. 13a, 13b, 13c, 13d, 13e, 13f, 13g, and 13h, where S is the mean of the variances from the four examples in the training set and N is the variance of the variances from the same training examples. S/N is a natural criterion, since the target characteristics sought are both prominent and invariant over the data set, which leads to large values of S/N.

Figure 13A:
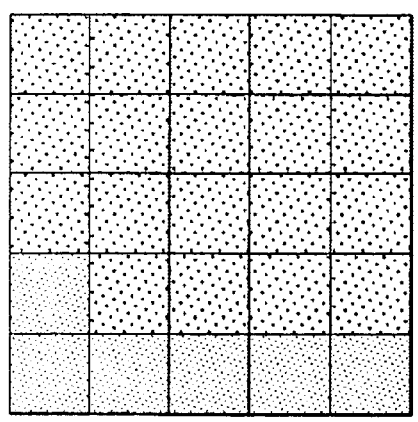
FIGS. 13a, 13b, 13c, 13d, 13e, 13f, 13g, and 13h show the 5×5 pixel filters derived from training data set II, which represent top eight principal components ordered by decreasing eigenvalue.
Figure 13B:
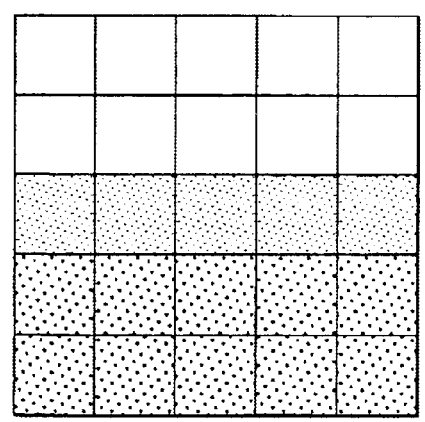
Figure 13C:
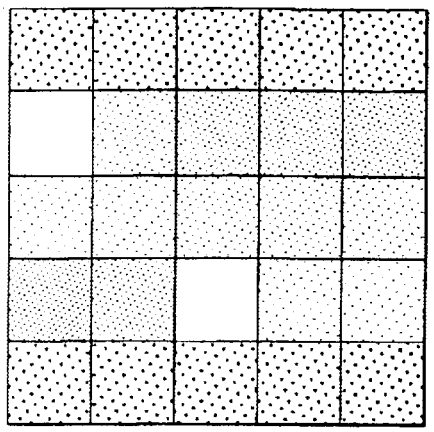
Figure 13D:
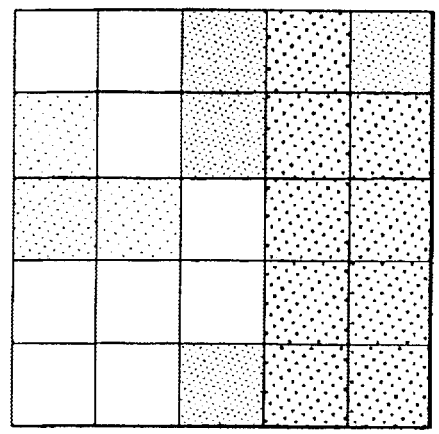
Figure 13E:
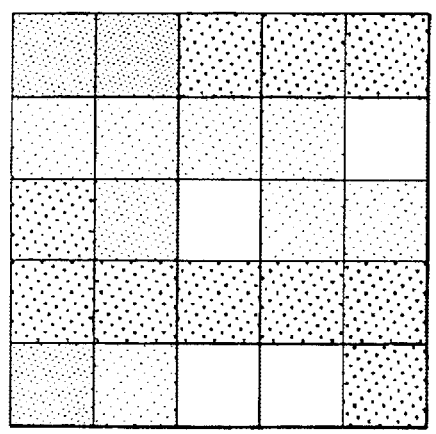
Figure 13F:
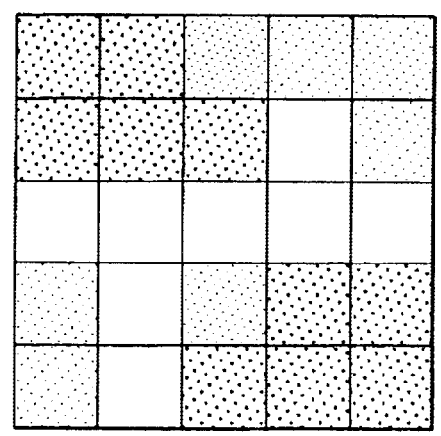
Figure 13G:
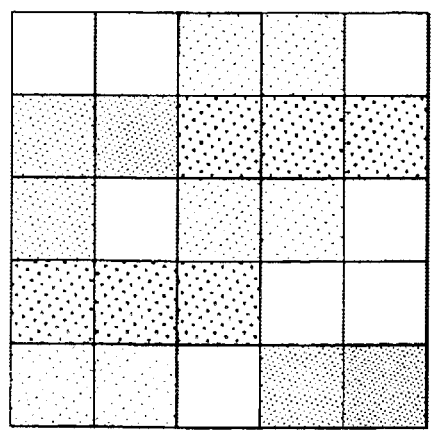
Figure 13H:
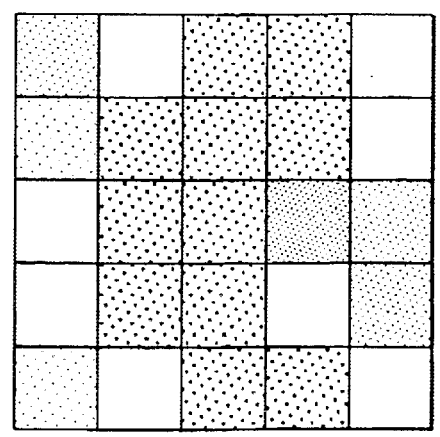
Figure 14:
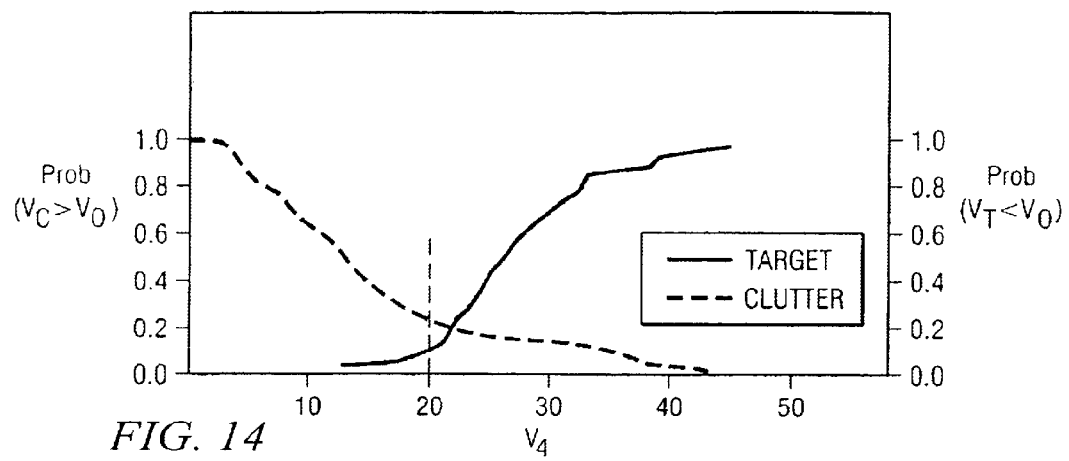
FIG. 14 is a graph showing variances derived from Filter 5 in FIG. 13e in conjunction with the probability of detection and the false alarm rate.

FIG. 14 is a graph showing variances derived from Filter 5 in FIG. 13e in conjunction with the probability of detection and the false alarm rate. $V_5$ denotes variances derived from Filter 5 in FIG. 13e. The dotted line is the lower bound on $V_t$ determined from the training data. With the lower bound, the probability of detection, $P_d$, is 0.89 and the false alarm rate, $P_{fa}$ is 0.27. As shown in FIG. 14, filter 5 had the largest S/N ratio among the eight generated and alone provides considerable separation of targets and clutter. FIG. 14 also shows a lower cutoff for the target region, as the training examples establish a lower bound on the target region in the feature space due to the higher degree of noise and corresponding smaller variance values associated with these examples. The use of noisy examples, (and, hence, examples more easily confused with clutter) helps estimate the true position (as determined from an infinitely large data set) of the classification discriminant surface from examples that lie close to the boundary between target and clutter than from examples that lie further away.

Figure 15A:
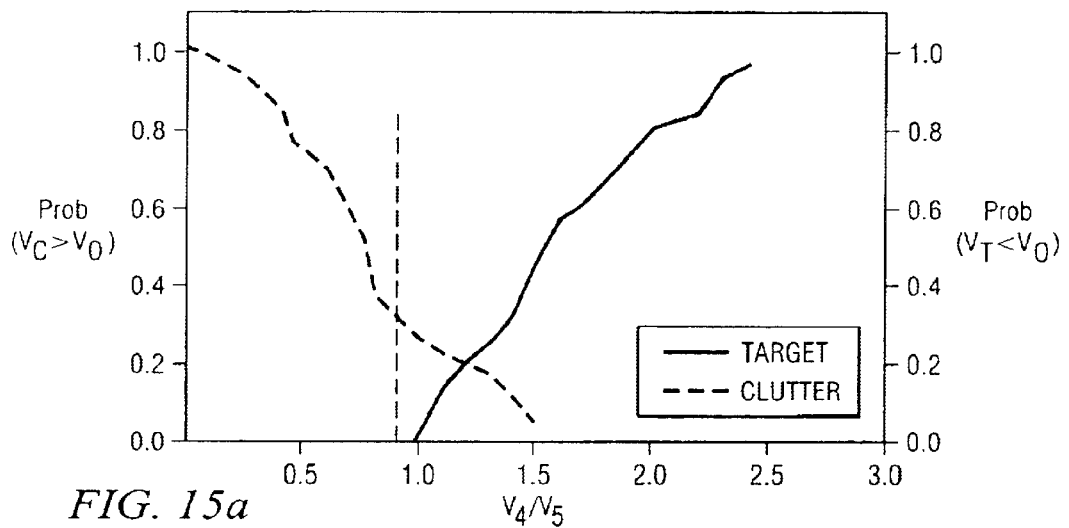
FIG. 15a is a graph showing the ratio of variances derived from Filters 4 and 5 in FIGS. 13d and 13e.

To achieve further separability of targets from clutter, the inventor also examined ratios of the variance values from the filters and found the ratios of the variance outputs from filters 4 and 5 in FIGS. 13*d* and 13*e* further distinguish targets and clutter, as shown in FIG. 15*a*. In particular, FIG. 15*a* is a graph showing the ratio of variances derived from Filters 4 and 5 in FIGS. 13*d* and 13*e*. $V_c$, $V_t$, and $V_o$ indicate the ratio of variances from Filters 4 and 5. The dotted line is determined from training data. The clutter curve uses only false alarms from the results in FIG. 14, whereas the target curve uses all the target points. Using the dotted line to discriminate targets and clutter (together with results from FIG. 14), the detection probability is defined to be 0.89 and the false alarm rate is defined to be 0.10, which is a significant improvement over 0.27.

Figure 15B:
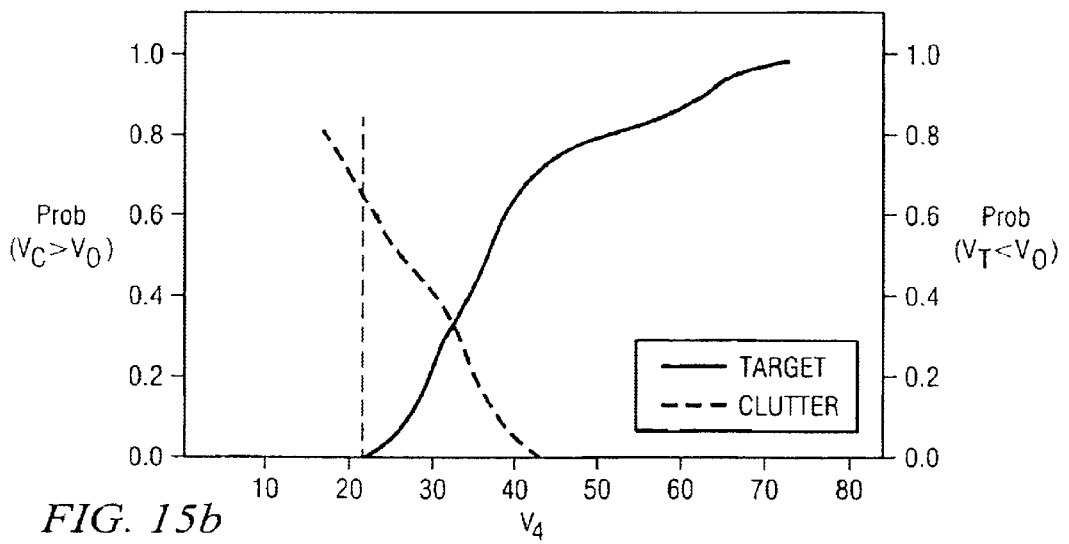
FIG. 15b is a graph showing the variance derived from Filter 4 in a second set of 5×5 pixel filters described in the detailed description in conjunction with the probability of detection and the false alarm rate.

In addition, the experiments used the training image to generate a second set of eight 5×5 pixel filters at a larger length scale by halving the spatial sampling density of the input vectors to the neural network. The filter with the second largest S/N ratio was the same as filter 5 in FIG. 13. This same filter further reduces the number of clutter points mistakenly identified as targets, as shown in FIG. 15*b*, which suggests some self-similarity in the target characteristics and indicates the persistence of a particular feature over a factor of two in length scales. In particular, FIG. 15*b* is a graph showing the variance derived from Filter 4 in a second set of 5×5 pixel filters described in the detailed description in conjunction with the probability of detection and the false alarm rate. $V_4$ is the variance derived from Filter 4 in a second set of 5×5 pixel filters, described infra. The clutter curve uses only false alarms from the results in FIG. 15*a*. All target points, however, are used. The dotted line is the discriminator between targets and clutter set by the training data. If the results shown in FIGS. 14, 15*a*, and 15*b* are used in sequence, the detection probability is determined to be 0.89 and the false alarm rate is determined to be 0.07, which is another significant improvement in performance. As a group, the three filters and their corresponding variance outputs establish a binary classification tree for distinguishing targets from background clutter. The final probability of detection (ratio of the number of targets detected to total number of targets) was 0.89, whereas the false alarm rate (ratio of the number of clutter points mistakenly classified as targets to total number of clutter points) was 0.07.

The values and ranges disclosed herein are given for a preferred embodiment of the present invention, of course these values may vary as the parameters are changed. Therefore it is to be understood that many changes in detail may be made as a matter of engineering choices without departing from the spirit and scope of the invention, as defined by the appended claims. In particular, alternate procedures that share the same functionally as the procedures discussed, supra, such as alternate classification techniques or data inputs, are plainly within the scope of the invention.

I claim:

1. A method for distinguishing targets from background clutter, comprising the steps of
   (a) inputting data;
   (b) calculating data statistics from said data and using said data statistics to select target specific feature information to distinguish specific targets from background clutter;
   (c) generating said target feature information from said data statistics;
   (d) extracting said target specific feature information from said data;
   (e) using said target specific feature information to distinguish specific targets from background clutter; and
   (f) outputting target and background clutter information.

2. The method of claim 1, wherein said data is one-dimensional, two-dimensional, or multi-dimensional.

3. The method of claim 1, wherein said data is digitized imagery, speech signals, or radar signals.

4. The method of claim 1, wherein parallel hardware architectures are employed to use said feature information to distinguish particular targets from background clutter.

5. The method of claim 4, wherein said parallel hardware architectures comprise neural networks.

6. The method of claim 1, wherein said feature information is contrast-based or texture-based.

7. The method of claim 1, wherein said feature information is further used to distinguish two target classes or a plurality of target classes from one another.

8. The method of claim 1, wherein Hebbian learning techniques are used to select said target specific feature information.

9. A classification system, comprising
   (a) a calculator to calculate data statistics from a data input;
   (b) a selector to use said data statistics outputed from said calculator to select target specific feature information to distinguish specific targets from background clutter, wherein said target specific feature information uniquely describes a target for recognition purposes;
   (c) a generator to generate said target specific feature information from said data statistics outputed from said calculator;
   (d) a feature extractor to extract target specific feature information from said data input; and
   (e) a classifier to use said target specific feature information extracted from said data input by said feature extractor to distinguish targets from background clutter and output target and background clutter data.

10. The classification system of claim 9, wherein said data input is one-dimensional, two-dimensional, or multidimensional.

11. The classification system of claim 9, wherein said data input is digitized imagery, speech signals or radar signals.

12. The classification system of claim 9, wherein parallel hardware architectures are employed in the classifier to use said feature information to distinguish particular targets from background clutter.

13. The classification system of claim 12, wherein said parallel hardware architectures comprise neural networks.

14. The classification system of claim 9, wherein said feature information is contrast-based or texture-based.

15. The classification system of claim 9, wherein said selector employs Hebbian learning techniques to select said target specific feature information.

16. A classification hardware system, comprising
(a) a calculator to calculate data statistics from a data input;
(b) a selector to use said data statistics outputed from said calculator to select target specific feature information to distinguish specific targets from background clutter, wherein said target specific feature information uniquely describes a target for recognition purposes;
(c) a generator to generate said target specific feature information from said data statistics outputed from said calculator,
(d) a feature extractor to extract target specific feature information from said data input; and
(e) a classifier to use said target specific feature information extracted from said data input by said feature extractor to distinguish targets from background clutter and output target and background clutter data.

17. The classification hardware system of claim 16, wherein said selector employs Hebbian learning techniques to select said target specific feature information.

18. A classification software system, comprising
(a) calculation software to calculate data statistics from a data input;
(b) selection software to use said data statistics outputed from said calculator to select target specific feature information to distinguish specific targets from background clutter, wherein said target feature information uniquely describes a target for recognition purposes;
(c) generator software to generate said target specific feature information from said data statistics outputed from said calculator;
(d) feature extraction software to extract target specific feature information from said data input;
(e) classification software to use said target specific feature information extracted from said data input by said feature extractor to distinguish targets from background clutter and output target and background clutter data; and
(f) wherein the calculation software, selection software, generator software, feature extraction software, and classification software reside on at least one computer-readable medium.

19. The classification software system of claim 18, wherein said selector employs Hebbian learning techniques to select said target specific feature information.

20. A method for distinguishing targets from background clutter, comprising the steps of
(a) inputting data having targets and background clutter;
(b) applying neural network learning procedures to said data to construct a set of operators;
(c) applying said set of operators to data to construct a set of features;
(d) choosing optimal features from said set of features to distinguish targets from clutter; and
(e) using said optimal features to distinguishing targets from background clutter.

* * * * *